(12) United States Patent
Peterzol-Parmentier

(10) Patent No.: US 11,287,537 B2
(45) Date of Patent: Mar. 29, 2022

(54) DETECTOR FOR HIGH-ENERGY RADIOGRAPHY AND ASSOCIATED IMAGING ASSEMBLY

(71) Applicant: FRAMATOME, Courbevoie (FR)

(72) Inventor: Angéla Peterzol-Parmentier, Macon (FR)

(73) Assignee: FRAMATOME, Courbevoie (FR)

( * ) Notice: Subject to any disclaimer, the term of this patent is extended or adjusted under 35 U.S.C. 154(b) by 18 days.

(21) Appl. No.: 16/608,114

(22) PCT Filed: Apr. 27, 2018

(86) PCT No.: PCT/EP2018/060911
§ 371 (c)(1),
(2) Date: Oct. 24, 2019

(87) PCT Pub. No.: WO2018/197684
PCT Pub. Date: Nov. 1, 2018

(65) Prior Publication Data
US 2021/0103061 A1 Apr. 8, 2021

(30) Foreign Application Priority Data

Apr. 28, 2017 (FR) ..................................... 17 53780

(51) Int. Cl.
*G01T 1/20* (2006.01)
(52) U.S. Cl.
CPC .......... *G01T 1/2018* (2013.01); *G01T 1/2002* (2013.01)
(58) Field of Classification Search
None
See application file for complete search history.

(56) References Cited

U.S. PATENT DOCUMENTS

| 2,541,599 A | * | 2/1951 | Morrison | ................. G21K 4/00 378/156 |
| 9,513,380 B2 | * | 12/2016 | Liu | ......................... G01T 1/202 |

(Continued)

FOREIGN PATENT DOCUMENTS

| EP | 1995608 A1 | 11/2008 |
| EP | 2889643 A1 | 7/2015 |

(Continued)

OTHER PUBLICATIONS

Corresponding Search Report PCT/EP2018/060911.

(Continued)

*Primary Examiner* — Edwin C Gunberg
(74) *Attorney, Agent, or Firm* — Davidson, Davidson & Kappel, LLC

(57) ABSTRACT

A detector (10) for high-energy radiography includes, in the following order: a metal screen (12) arranged to receive incident radiation, at least part of the incident radiation being transmitted through the metal screen and forming a transmitted radiation, a scintillator component (14) arranged to convert the radiation transmitted by the metal screen into light, and a detection layer (16) arranged to detect the intensity of the light emitted by the scintillator component. The screen (12) is made of a metal having an atomic number that is strictly greater than 70 or is made of an alloy comprising at least 50% mass content of one or more metals having an atomic number that is strictly greater than 70 and in that the thickness of the screen is between 20 μm and 900 μm.

13 Claims, 5 Drawing Sheets

(56) References Cited

U.S. PATENT DOCUMENTS

2005/0023479 A1 2/2005 Grodzins
2014/0264083 A1 9/2014 Henry et al.
2017/0084358 A1 3/2017 Osterloh et al.

FOREIGN PATENT DOCUMENTS

EP 2916145 A1 9/2015
JP H 02-248891 A 10/1990

OTHER PUBLICATIONS

M. Yao et al.: "X-Ray Imaging Plate Performance Investigation based on a Monte Carlo Simulation Tool", Spectrochimica ACTA. Part B: Atomic Spectroscopy, vol. 103-104, Jan. 1, 2015, pp. 84-91.
Office Action issued in corresponding Japanese Patent Application No. 2019-558416, dated Jan. 2022 (and English computer translation from Espacenet.com).

* cited by examiner

DETECTOR FOR HIGH-ENERGY RADIOGRAPHY AND ASSOCIATED IMAGING ASSEMBLY

The present invention relates to a detector for high-energy radiography.

BACKGROUND

Matrix detectors with indirect conversion are known from the state of the art. It is common to use them with an x-ray source. The sensor for example converts the incident x-rays into light, which in turn is converted into an electrical signal. Measuring the intensity of the electrical signal makes it possible to obtain the intensity of the incident x-rays.

However, these detectors are not optimized for high-energy sources.

In particular, one current detector model in particular comprises a metal screen made from copper in particular serving to filter the incident signal.

When the metal screen is passed through by photons, a first portion of these photons interacts with the copper by photoelectric effect and a second portion interacts by Compton scattering. Compton scattering corresponds to the phenomenon observed when an incident photon collides with a free electron of an atom and an electron is ejected from the atom, while the photon is scattered. The scattered photon does not have the same direction as the incident photon and has less energy. Thus, the Compton scattering phenomenon causes a deterioration of the spatial resolution and a low gain at the output of the metal screen. On the contrary, when a photon interacts by photoelectric effect, the photon is absorbed by the atom and all of its energy is transmitted to an electron of the deep layers, which is ejected by the atom. After the absorption of the photon, the photoelectron emits an energy $Ee=Eph-Eb$, where $Eb$ is the bonding energy of the photoelectron and $Eph$ is the energy of the incident photon. At energies and atomic numbers where this process is significant, the emitted electron is absorbed over a very short distance, around several hundreds of micrometers (μm), such that if a photoelectron leaves the metal screen to the next be absorbed by the layer of the scintillator, the loss of spatial resolution is negligible compared to Compton scattering.

Several factors are at play regarding the fact that the photons will on average interact to varying degrees by photoelectric effect or by Compton scattering.

However, the known detectors create a significant likelihood for each photon to interact by Compton scattering and have a poor spatial resolution when the incident radiation has high energy.

SUMMARY

One aim of the present disclosure is therefore to improve the gain of a detector in the context of high-energy radiography while maintaining a good spatial resolution.

To that end, a detector for high-energy radiography is provided, comprising, in the following order:
- a metal screen arranged to receive incident radiation, at least part of the incident radiation being transmitted through the metal screen and forming a transmitted radiation,
- a scintillator component arranged to convert the radiation transmitted by the metal screen into light, and
- a detection layer arranged to detect the intensity of the light emitted by the scintillator component, wherein the screen is made of a metal having an atomic number that is strictly greater than 70 or is made of an alloy comprising at least 50% mass content of one or more metals having an atomic number that is strictly greater than 70 and in that the thickness of the screen is between 20 μm and 900 μm.

According to specific embodiments of the invention, the detector has one or more of the following features, considered alone or according to any technically possible combination(s):
- the detector is planar,
- the screen has a thickness between 100 μm and 275 μm,
- the metal screen is made from uranium, preferably depleted, and the screen has a thickness between 125 μm and 175 μm,
- the metal screen is made from thorium and the screen has a thickness between 225 μm and 275 μm,
- the metal screen is made from bismuth and the screen has a thickness between 225 μm and 275 μm,
- the metal screen is in contact with the scintillator component,
- the detector comprises a support layer, the support layer being between the metal screen and the scintillator component,
- the detector comprises a support layer, the support layer having a thickness between 1 μm and 300 μm,
- the scintillator component is made from gadolinium oxysulfide, and
- the scintillator component has a thickness between 100 μm and 300 μm.

A radiographic imaging assembly is also provided comprising an ionizing radiation source having an energy between 100 keV (kilo-electron-volt) and 50 MeV (mega-electron-volt).

According to specific embodiments of the invention, the radiographic imaging assembly has the following feature:
- the source is an iridium-192 gamma source, with an average energy of between 370 keV and 390 keV, or selenium 75 or cobalt 60.

BRIEF SUMMARY OF THE DRAWINGS

The invention will be better understood upon reading the following description, provided solely as an example, and in reference to the appended drawings, in which.

DETAILED DESCRIPTION

The present disclosure relates to a radiographic imaging assembly comprising an ionizing radiation source and a detector.

The ionizing radiation source has an energy between 100 keV (kilo-electron-volt) and 50 MeV (mega-electron-volt), more specifically between 200 keV and 20 MeV.

As a reminder, an electron-volt is defined as the kinetic energy acquired by an electron accelerated from rest by a difference in potential of one volt.

In one embodiment, the source is an iridium-192 source, i.e., the isotope of iridium having a mass number equal to 192. The iridium-192 source for example has an average energy of between 370 keV and 390 keV.

Alternatively, the source is a selenium 75 or cobalt 60 source.

Figure 1:
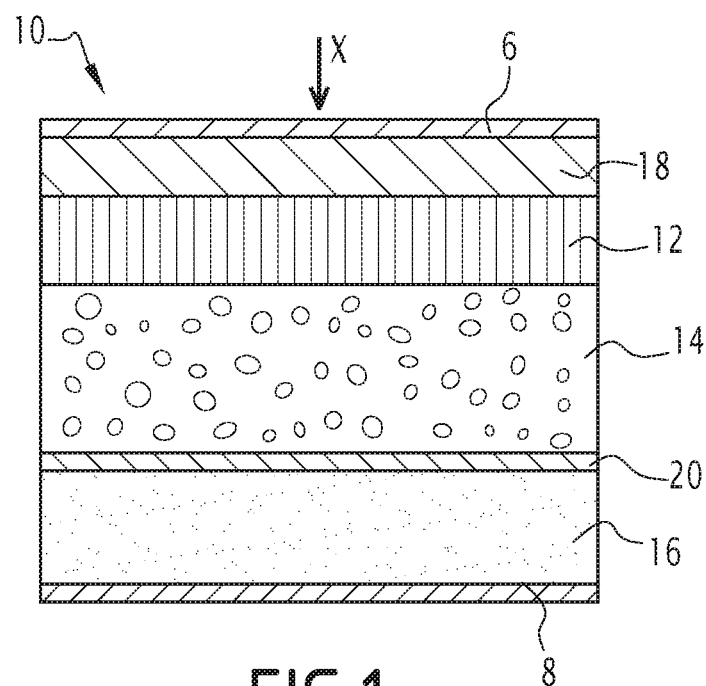
FIG. 1 is a sectional schematic view of a first embodiment of a detector according to the invention.

A first embodiment of the detector 10 is shown in FIG. 1, in which the detector 10 is planar.

The detector defines an input surface 6 and an output surface 8.

The input surface 6 is substantially parallel to the output surface 8 and defines a transverse plane. The direction perpendicular to the transverse plane is called longitudinal direction X.

The detector comprises, in the following order, a metal screen 12, a scintillator component 14 and a detection layer 16.

In the first embodiment, the detector 10 further comprises a support layer 18 on the metal screen 12 at the input surface 6 and a protective layer 20 between the scintillator component 14 and the detection layer 16.

Thus, in order, the detector 10 comprises:
the support layer 18,
the metal screen 12,
the scintillator component 14,
the protective layer 20, and
the detection layer 16.

The metal screen 12, the scintillator component 14 and the detection layer 16 are arranged in the form of layers.

Each layer is planar and has a respective thickness, defined as the dimension of the layer in the longitudinal direction, substantially constant.

The support layer 18 and the protective layer 20 are planar and have a respective constant thickness.

The metal screen 12, the scintillator component 14 and the detection layer 16 are arranged in the form of layers. Said surface is for example rectangular. The surface for example has a surface area of between 1 cm² and 50 cm².

The support layer 18 and the protection layer 20 for example have the same surface parallel to the transverse plane as the metal screen 12, the scintillator component 14 and the detection layer 16.

In a variant, the set of layers do not have the same surface parallel to the transverse plane and are superimposed at least in an active zone.

The support layer 18 in particular makes it possible to provide a support for the scintillator.

The support layer 18 is made from plastic and has a thickness between 1 μm and 300 μm.

The support layer 18 is for example made from polyethylene terephthalate, or PET. PET is for example marketed under the Mylar® trademark. It transmits at least 90% of the light in the visible spectrum and more than 95% of x-rays.

The metal screen 12 is arranged to receive an incident radiation.

At least part of the incident radiation is transmitted through the metal screen 12 and forms a transmitted radiation.

The screen 12 is made from a pure metal having an atomic number strictly greater than 70, in particular tantalum (Ta), tungsten (W), platinum (Pt), lead (Pb), bismuth (Bi), thorium (Th) or uranium (U). Pure metal refers to a metal whose purity is strictly greater than 99.00%, i.e., whereof the quantity of metal in the screen is strictly greater than 99.00%.

Alternatively, the screen 12 is made from an alloy comprising at least 50%, preferably at least 90%, by mass content of one or several metals having an atomic number strictly greater than 70.

The screen 12 has a thickness of between 20 μm and 900 μm, more particularly between 100 μm and 400 μm, in particular between 100 μm and 275 μm.

In one specific embodiment, the metal screen 12 is made from uranium, preferably depleted. The screen has a thickness of between 125 μm and 175 μm.

In a variant, the metal screen is made from thorium. The screen has a thickness of between 225 μm and 275 μm.

In a variant, the metal screen is made from bismuth. The screen has a thickness of between 225 μm and 275 μm.

In a variant, the metal screen is made from lead. The screen has a thickness of between 225 μm and 275 μm.

The scintillator component 14 is arranged to convert the radiation transmitted by the metal screen 12 into light. Hereinafter, light refers to any electromagnetic wave having one or more wavelengths comprised in a spectrum, for example between 380 nm and 780 nm.

The scintillator component 14 is for example made from gadolinium oxysulfide. The chemical formula of gadolinium oxysulfide is $Gd_2O_2S$ and is usually denoted GOS.

Alternatively, the scintillator component 14 is made from one of the following materials: CsI:Tl, $Gd_2O_2S$:Tb, CsI:Na, NAI:Tl, $CaWO_4$, $ZnWO_4$, $CdWO_4$, $Bi_4Ge_3O_{12}$, $Lu_{1.8}Yb_{0.2}SiO_5$:Ce, $Gd_2SiO_5$:Ce, $BaFCl:Eu^{2+}$, $BaSO_4:Eu^{2+}$, $BaFBr:Eu^{2+}$, $LaOBr:Tb^{3+}$, $LaOBr:Tm^{3+}$, $La_2O_2S:Tb^{3+}$, $Y_2O_2S:Tb^{3+}$, $YTaO_4$, $YTaO_4$:Nb, ZnS:Ag, (Zn,Cd)S:Ag, $ZnSiO_4:Mn^{2+}$, CsI, $LiI:Eu^{2+}$, $PbWO_4$, $Bi_4Si_3O_{12}$, $Lu_2SiO_5:Ce^{3+}$, $YAlO_3:Ce^{3+}$, CsF, $CaF_2:Eu^{2+}$, $BaF_2$, $CeF_3$, $Y_{1.34}Gd_{0.6}O_3:Eu^{3+}$, Pr, $Gd_2O_2S:Pr^{3+}$, Ce, SCGI, $HFG:Ce^{3+}$ (5%) and $C_{14}H_{10}$.

The scintillator component 14 has a thickness of between 100 μm and 300 μm.

The metal screen 12 is in close or direct contact with the scintillator component 14. Such close contact in particular makes it possible to have a greater gain of the detector on the radiation, in particular for energies of less than a mega-electron-volt.

The protective layer 20 is made from a plastic material, for example PET.

The protective layer 20 has a thickness of less than 30 μm, preferably less than 15 μm, for example of between 5 μm and 15 μm. A small thickness in particular makes it possible to have a better spatial resolution.

The detection layer 16 is arranged to detect the intensity of the light emitted by the scintillator component 14 over a given spectrum. The given spectrum is comprised in the visible domain, i.e., between 380 nm and 780 nm, more particularly in the blue or green visible domain.

The detection layer for example comprises a photodiode matrix. The pitch between the photodiodes, commonly called "pixel pitch", is between 25 μm and 200 μm.

Each photodiode is able to convert the incident light into an electric signal. A relationship between the intensity of the incident light and a parameter of the electric signal, such as the voltage, is known in the form of a characteristic curve of the photodiode.

The photodiodes of the matrix are adjacent, such that all of the light emitted by the scintillator component is received by the photodiodes.

The detection layer 16 is therefore able to measure the light intensity received on the given spectrum at a point represented by a photodiode.

Figure 2:
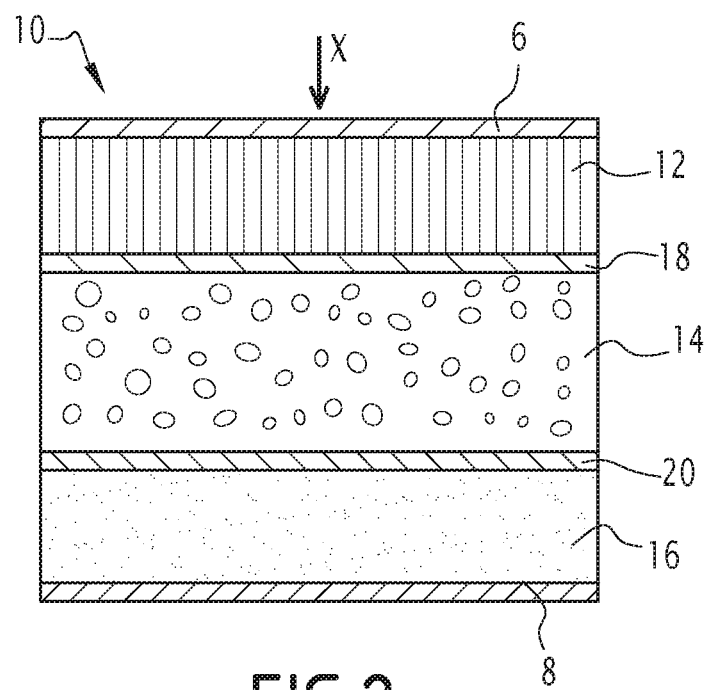
FIG. 2 is a sectional schematic view of a second embodiment of a detector according to the invention.

A second embodiment of the detector is shown in FIG. 2.

Only the elements by which the second embodiment of the detector differs from the first embodiment are described hereinafter. The elements that are similar between the first embodiment and the second embodiment have a same reference.

In the second embodiment, the position of the metal screen 12 and that of the support layer 18 relative to the other elements of the detector 10 are swapped. In particular, the support layer 18 is located between the metal screen 12 and the scintillator component 14.

The operation of the imaging assembly comprising a detector according to the first embodiment will now be described in an application where this assembly images an element.

The element is any element able to be imaged with a source having an energy between 100 keV and 1 MeV, more specifically an iridium-192 gamma source.

The element is for example a thick weld, in particular greater than or equal to 80 millimeters (mm), or difficult to access, a thick component, a tubing having a thickness between 75 mm and 90 mm.

Alternatively, the element is a cast iron or forged part.

The ionizing radiation source emits radiation toward the element to be imaged. The radiation interacts with the element, such that the radiation is modified based on different parameters of the element, for example the material, the thickness, the presence of flaws, etc.

The radiation is next oriented toward the detector 10 and forms an incident radiation transmitted at the input of the detector 10, more particularly on the input surface 6. The incident radiation at the input of the detector contains the radiation transmitted by the element to be imaged and that diffused by the latter.

The metal screen 12 receives the incident radiation, in particular after the radiation has passed through the support layer 18.

Part of the incident radiation is transmitted by the metal screen 12, i.e., it passes through the metal screen 12 without interacting with it, and forms a transmitted radiation.

Part of the incident radiation interacts with the metal screen 12 primarily by photoelectric effect, which is the phenomenon that best preserves the spatial resolution of the imaging system.

The incident radiation is able to interact with the metal screen 12 by other phenomena, for example by Compton scattering. Secondary phenomena, such as fluorescence and/or Bremstralung radiation, are also possible. Electrons may also be generated and emitted by the metal screen 12.

The radiation transmitted by the metal screen 12 and all of the secondary radiation (electrons and photons) generated by the metal screen 12 then reach the scintillator component 14.

This transmitted and generated radiation is converted by the scintillator component 14 into light. The greater the intensity is of the radiation that reaches the scintillator component 14, the higher the intensity of the light is. There is for example a linear relationship between the energy deposited in the scintillator component 14 by all of the radiation at the input of the scintillator component 14 and the light intensity at the output of the scintillator component 14.

The light then passes through the protective layer 20.

The detection layer 16 next detects the intensity of the light over the given spectrum that it receives. More particularly, each photodiode detects the received light intensity and converts it into an electric signal according to its characteristic curve. Thus, the detection layer 16 measures the light intensity in a matrix of points and converts it into an electric signal matrix.

Each electric signal is representative of a characteristic of the element to be imaged at a point or a zone.

Each electric signal is converted into a piece of information, for example into a gray level, so as to form an image of the element to be imaged.

The image in particular makes it possible to identify flaws in the element that may present weak spots, for example, in a weld.

An imaging assembly comprising a detector according to the second embodiment works similarly to what was previously described.

Figure 3:
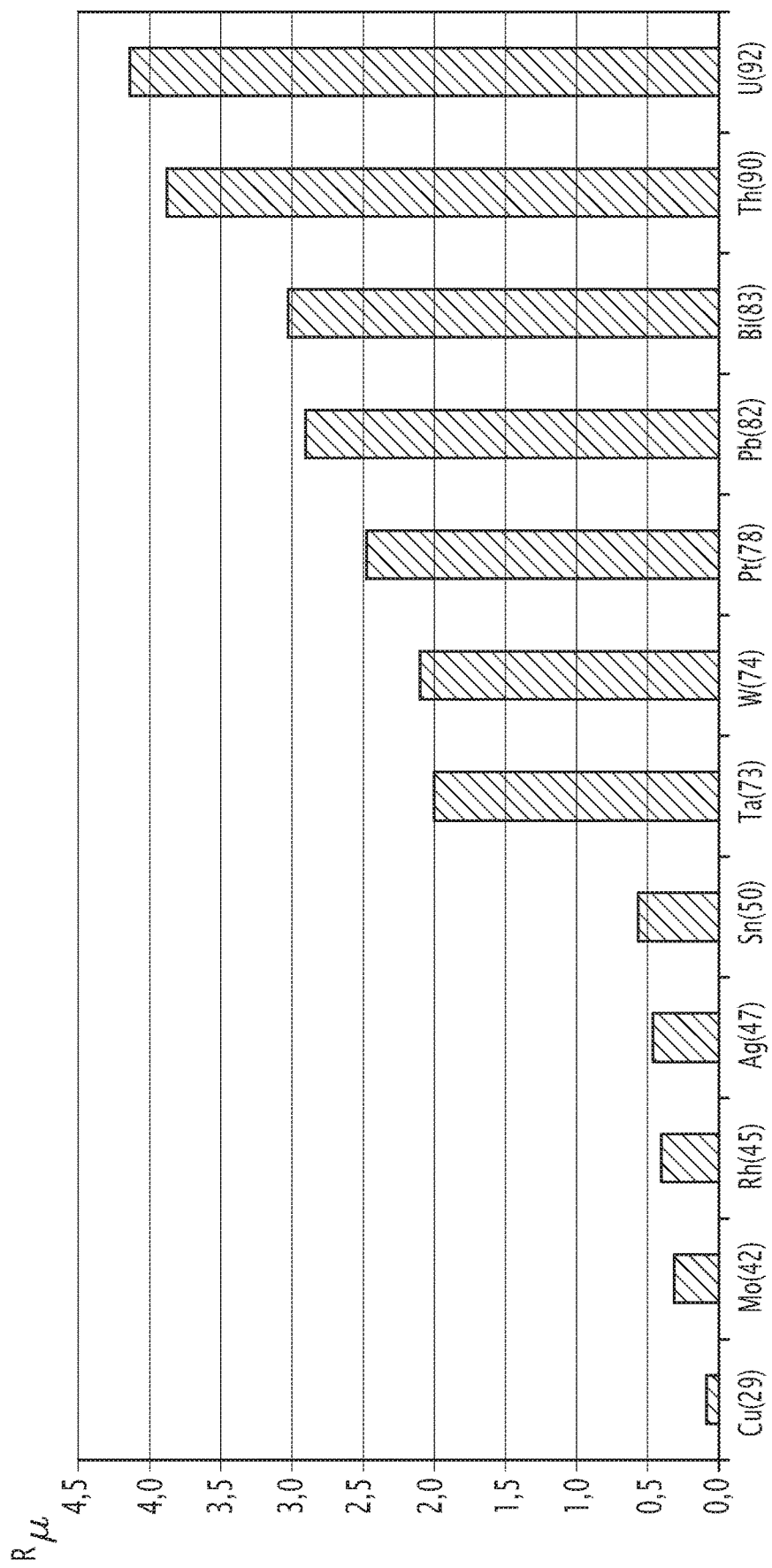
FIG. 3 is a diagram showing a ratio of attenuation coefficients as a function of the material.

To visualize certain advantages of the use of a screen made from a metal having an atomic number strictly greater than 70, a ratio $R_\mu$ was calculated for different metals and shown for each metal in FIG. 3. The ratio $R_\mu$ is independent of the thickness of the metal screen 12.

The radiation source is identical for all of the calculations. Here it is an iridium-192 gamma source.

The ratio $R_\mu$ is the ratio between a linear attenuation coefficient by photoelectric effect and a linear attenuation coefficient by Compton scattering. The linear attenuation coefficients by photoelectric effect and by Compton scattering are calculated as a weighted average over the spectrum of the iridium-192 of the attenuation coefficients, respectively, by photoelectric effect and by Compton scattering at the energies of the spectrum.

The calculation of the average coefficient is done with the following formula:

$$<\mu> = \Sigma_{i=1}^{N} \mu(E_i) P(E_i) \qquad (1)$$

with $P(E_i)$ the likelihood of having a photon with energy $E_i$ in the spectrum of the Ir192, $<\mu>$ the weighted average of the attenuation coefficient and $\mu(E_i)$ the attenuation coefficient for the photon with energy $E_i$. To calculate the attenuation coefficients, the XCOM database by NIST is used.

The ratio $R_\mu$ is then defined as follows:

$$R_\mu = <\mu_{ph}>/<\mu_{Compton}> \qquad (2)$$

Thus, the higher the ratio $R\mu$ is, the higher the likelihood is that an incident radiation will interact with the metal screen by photoelectric effect rather than by Compton scattering.

Copper (Cu), molybdenum (Mo), rhodium (Rh), silver (Ag) and tin (Sn) respectively have an atomic number equal to 29, 42, 45, 47 and 50, i.e., strictly less than 70. Each metal screen made from one of these metals has a ratio $R_\mu$ strictly lower than 0.75, i.e., it is likelier that each photon of the incident radiation will interact by Compton scattering rather than by photoelectric effect.

Tantalum (Ta), tungsten (W), platinum (Pt), lead (Pb), bismuth (Bi), thorium (Th) and uranium (U) respectively have an atomic number equal to 73, 74, 78, 82, 83, 90 and 92, i.e., strictly greater than 70. Each metal screen made from one of these metals has a ratio $R_\mu$ greater than or substantially equal to 2, i.e., it is likelier that each photon of the incident radiation will interact by photoelectric effect rather than by Compton scattering.

The use of tantalum (Ta), tungsten (W), platinum (Pt), lead (Pb), bismuth (Bi), thorium (Th) and uranium (U) therefore in particular makes it possible to limit the Compton scattering in the metal screen, so as to have an improved spatial resolution and gain relative to a copper or molybdenum screen.

To view the increase in the gain with a screen made from a metal having an atomic number strictly greater than 70 and having a thickness of between 20 μm and 900 μm, a gain G has been calculated for different materials and for different thicknessesxof the metal screen.

The radiation source is identical for all of the calculations. Here it is an iridium-192 gamma source.

The scintillator component 14 here is made from gadolinium oxysulfide and has a thickness substantially equal to 208 μm.

The gain G is defined as the ratio between the total energy $E_M$ deposited on the scintillator component 14 with a detector according to the configuration described in the first embodiment and the total energy $E_0$ deposited on the scintillator component 14 without a metal screen, or $G=E_M/E_0$.

Figure 4:
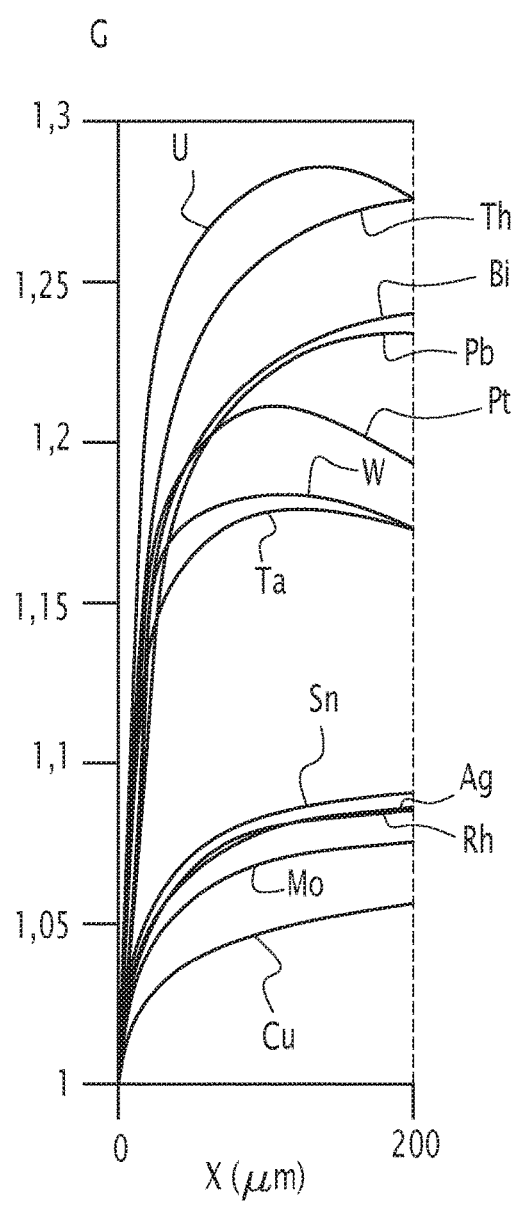
FIG. 4 is a curve showing the gain obtained by exemplary metal screens made from different materials and for a thickness between 0 and 200 μm.
Figure 5:
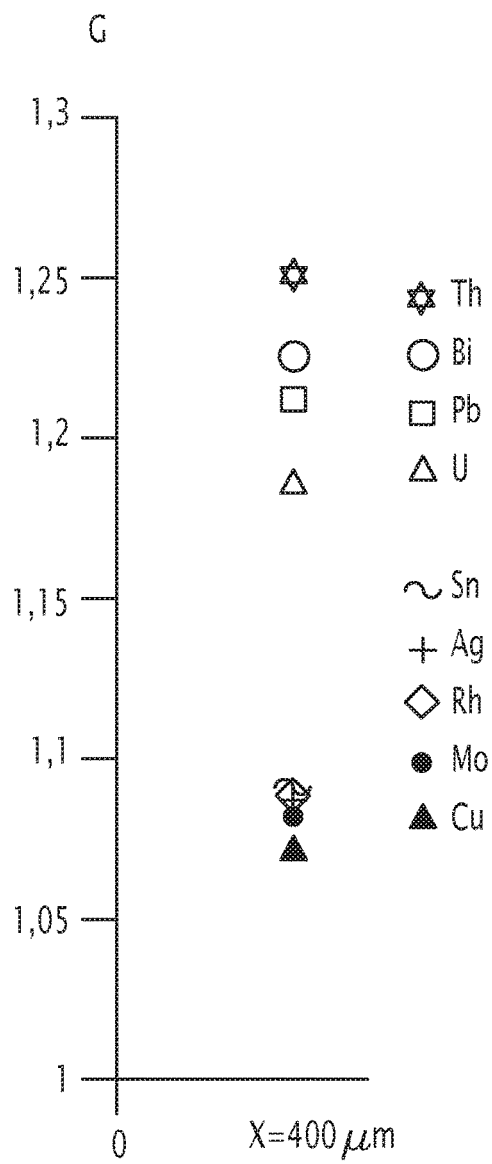
FIG. 5 is a diagram showing the gain obtained by exemplary metal screens of FIG. 4 for a thickness equal to 400 μm.
Figures 6, 7:
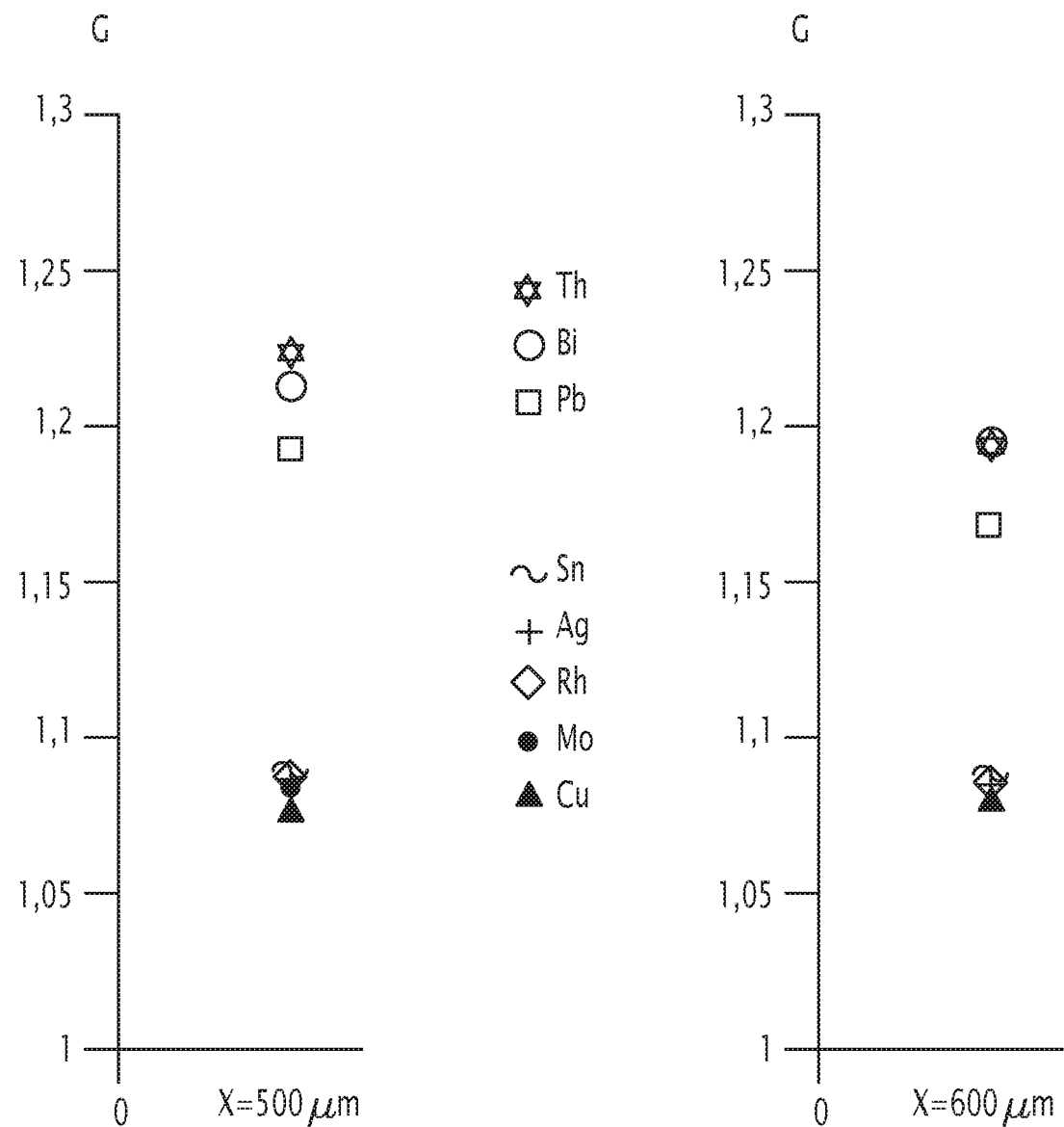
FIG. 6 is a diagram showing the gain obtained for the exemplary metal screen of FIG. 5 for a thickness equal to 500 μm.
FIG. 7 is a diagram showing the gain obtained for the exemplary metal screen of FIG. 5 for a thickness equal to 600 μm.
Figure 8:
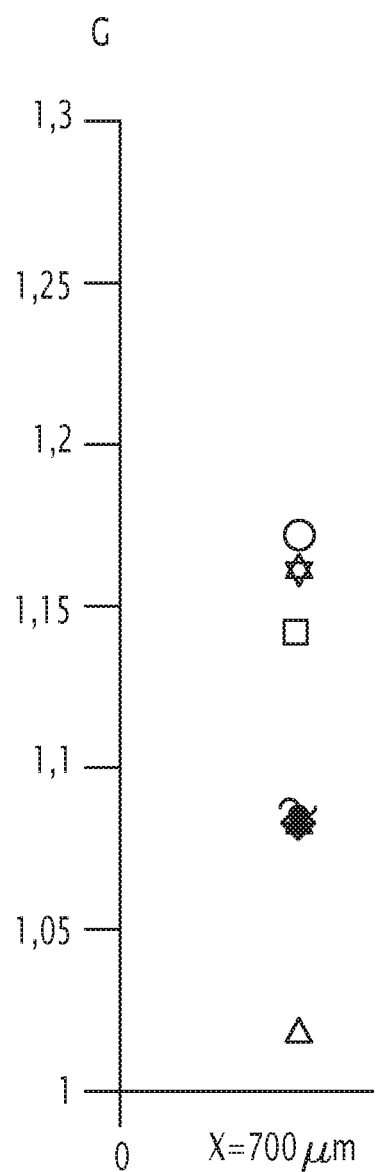
FIG. 8 is a diagram showing the gain obtained for the exemplary metal screen of FIG. 5 for a thickness equal to 700 μm.
Figure 9:
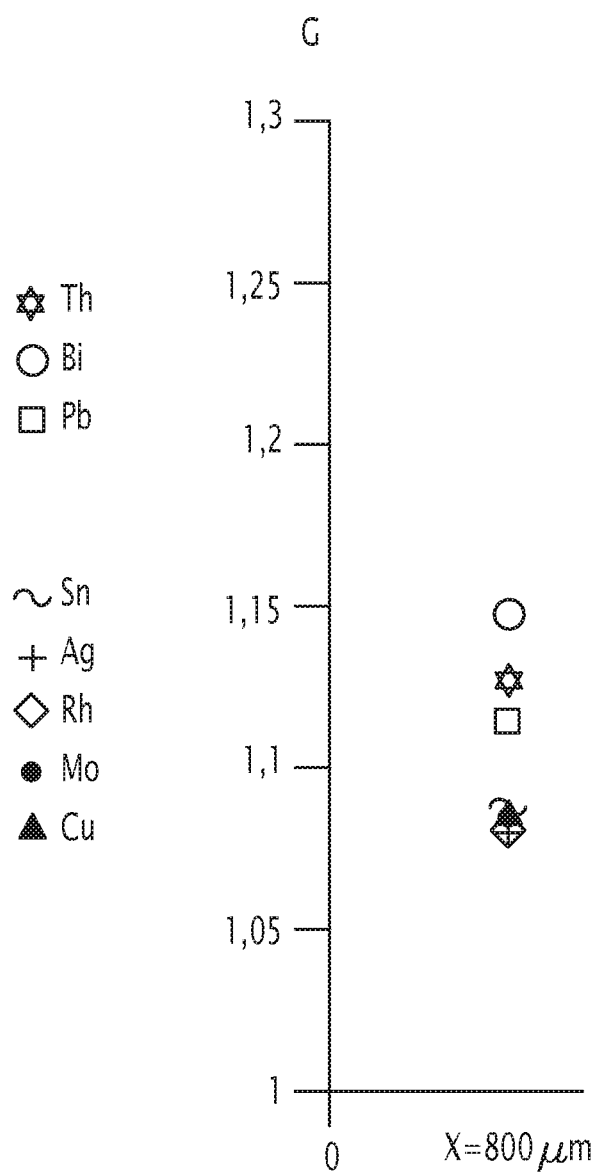
FIG. 9 is a diagram showing the gain obtained for the exemplary metal screen of FIG. 5 for a thickness equal to 800 μm.

FIG. 4 is a curve showing the gain obtained for a thickness between 0 and 200 μm for different materials.

FIGS. 5, 6, 7, 8 and 9 respectively show the gain obtained for a thickness equal to 400 μm, 500 μm, 600 μm, 700 μm and 800 μm for different materials.

The gain obtained for copper (Cu), molybdenum (Mo), rhodium (Rh), silver (Ag) and tin (Sn) is strictly less than 1.10 for any thickness between 0 and 800 μm.

The gain obtained for tantalum (Ta), tungsten (W), platinum (Pt), lead (Pb), bismuth (Bi), thorium (Th) and uranium (U) is strictly greater than 1.15 for any thickness between 0 and 200 μm.

The gain obtained for lead (Pb), bismuth (Bi), thorium (Th) and uranium (U) is strictly greater than 1.15 for a thickness of 400 μm.

The gain obtained for lead (Pb), bismuth (Bi) and thorium (Th) is strictly greater than 1.15 for thicknesses of 500 μm and 600 μm and strictly greater than 1.10 for thickness of 700 μm and 800 μm.

Thus, the use of tantalum (Ta), tungsten (W), platinum (Pt), lead (Pb), bismuth (Bi), thorium (Th) and uranium (U) in particular makes it possible to obtain a higher gain relative to a copper or molybdenum screen.

It was in particular calculated that the maximum gain for tantalum (Ta), tungsten (W), platinum (Pt), lead (Pb), bismuth (Bi), thorium (Th) and uranium (U) is between 1.18 and 1.29 under the conditions previously described.

Furthermore, the maximum gain for screens made from tantalum, tungsten, platinum, lead, bismuth, thorium and uranium is achieved for thicknesses of between 50 μm and 300 μm.

In particular, the maximum gain for a detector comprising a screen made from depleted uranium is obtained for a thickness of between 125 μm and 175 μm, and in the case of thorium, the maximum gain is obtained for a thickness of between 225 μm and 275 μm.

This therefore makes it possible to select the thickness of the metal screen to obtain a maximum gain based on the nature of the metal chosen beforehand.

Such an imaging assembly therefore makes it possible to obtain an optimized gain and a good spatial resolution, in particular for an iridium-192 gamma source. An optimized gain in particular makes it possible to reduce the exposure time of the element to be imaged.

Alternatively, the source of the imaging assembly is a linear accelerator that emits high-energy radiation, for example, between 1 MeV and 25 MeV. Such an imaging assembly is in particular able to be used for a radiographic exam done, for example, before beginning a radiotherapy session.

More generally, the detector according to the present disclosure can be used in nuclear imaging.

What is claimed is:

1. A detector for high-energy radiography, comprising, in the following order:
    a metal screen arranged to receive incident radiation, at least part of the incident radiation being transmitted through the metal screen and forming a transmitted radiation
    a scintillator component arranged to convert the radiation transmitted by the metal screen into light; and
    a detection layer arranged to detect the intensity of the light emitted by the scintillator component,
    the metal screen having one of the following features:
    the metal screen is made from uranium and has a thickness between 125 μm and 175 μm, or
    the metal screen is made from thorium and has a thickness between 225 μm and 275 μm, or
    the metal screen is made from bismuth and has a thickness between 225 μm and 275 μm.

2. The detector according to claim 1, wherein the detector is planar.

3. The detector according to claim 1, wherein the metal screen is made from uranium and has a thickness between 125 μm and 175 μm.

4. The detector according to claim 1, wherein the metal screen is made from depleted uranium.

5. The detector according to claim 1, wherein the metal screen is made from thorium and has a thickness between 225 μm and 275 μm.

6. The detector according to claim 1, wherein the metal screen is made from bismuth and has a thickness between 225 μm and 275 μm.

7. The detector according to claim 1, wherein the metal screen is in contact with the scintillator component.

8. The detector according to claim 1, further comprising a support layer, the support layer being between the metal screen and the scintillator component.

9. The detector according to claim 1, further comprising a support layer, the support layer having a thickness between 1 μm and 300 μm.

10. The detector according to claim 1, wherein the scintillator component is made from gadolinium oxysulfide.

11. The detector according to claim 1, wherein the scintillator component has a thickness between 100 μm and 300 μm.

12. A radiographic imaging assembly comprising:
    an ionizing radiation source having an energy between 100 keV and 50 MeV; and
    the detector according to claim 1.

13. The radiographic imaging assembly according to claim 12, wherein the ionizing radiation source is an iridium-192 gamma source, with an average energy of between 370 keV and 390 keV, or selenium 75 or cobalt 60.

* * * * *